Nov. 6, 1934. G. BOJNER 1,979,602
APPARATUS FOR CARRYING OUT HEAT EXCHANGE PROCESSES
Filed Aug. 18, 1931 2 Sheets-Sheet 1

Inventor:
Gustav Bojner
By Emil Bonnelycke
Attorney

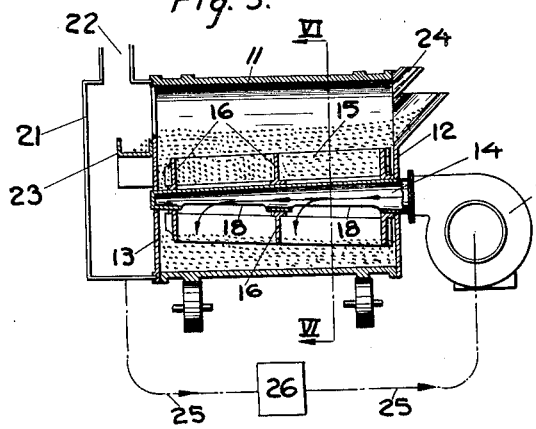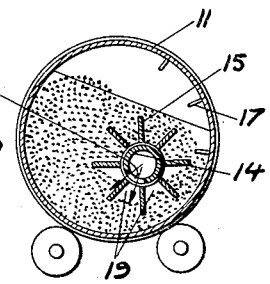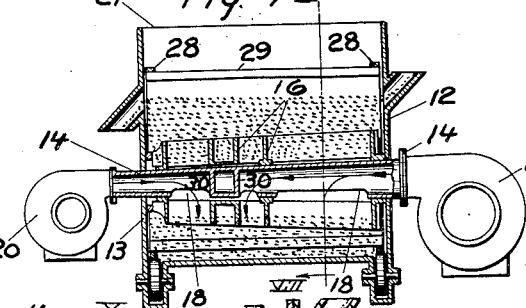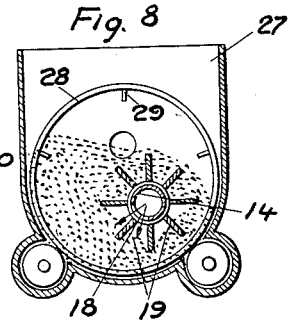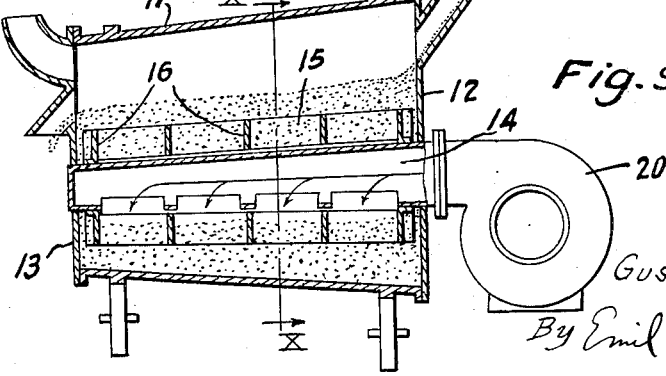

Patented Nov. 6, 1934

1,979,602

UNITED STATES PATENT OFFICE 1,979,602

APPARATUS FOR CARRYING OUT HEAT EXCHANGE PROCESSES

Gustav Bojner, Stockholm, Sweden, assignor to Aktiebolaget Svenska Fläktfabriken, Stockholm, Sweden Application August 18, 1931, Serial No. 557,866
In Sweden August 2, 1930

13 Claims. (Cl. 34—5)

This invention relates to an apparatus for carrying out heat exchange processes, such as drying, calcinating, carbonizing, cooling or other treatment of materials in the form of powder, grains or pieces using heat transmitting and heat absorbing gases respectively, also evaporation of liquids, solutions or the like using heat-transmitting gases or cooling of gases or condensation of vapours using cooling liquid.

The apparatus consists substantially of a horizontal or oblique rotatable drum of a large charge volume, said drum having one or more vane wheels rotatably arranged in the longitudinal direction, for effectively mixing the charge and distributing in the same or possibly conveying from the same the gas in question.

When liquid is to be evaporated by using heat-carrying gas or vapour, condensation takes place by means of cooling liquid, both gas and vapour and liquid respectively are simultaneously introduced into the charge.

In the accompanying drawings are illustrated some embodiments of the apparatus according to this invention.

Figures 1, 2 and 3 show longitudinal sections of rotatable drums with stationary end plates, the drums according to Figures 1 and 2 being horizontally arranged.

The drum according to Figure 3 is arranged in an oblique position.

Figures 5, 6, 7 and 8 show another construction of the apparatus according to this invention. The fact is that here the vane wheel is mounted around a slit pipe or the like, through which pipe the gas is supplied to the canals formed by the vane wheel in the charge.

Figure 5 illustrates a longitudinal section through a rotatable drum.

Figure 6 is a cross section VI—VI in Figure 5.

Figure 7 is a sectional view of a modified form of construction.

Figure 8 is a sectional view taken on line VIII—VIII of Figure 7.

Figure 9 is a view similar to Figure 7 of a further modified form of the invention.

The rotatable drum is indicated by 1, the stationary end plates by 2 and 3 respectively. These end plates are provided with inlets and outlets for material above the level of the charge, but either the inlet or the outlet or both of them may in certain cases be located below the level of the charge, the material being then supplied or removed by known devices keeping tight against gases to a certain extent.

The fan for forcing gas and vapour respectively into the charge is indicated by 5.

Figure 1:
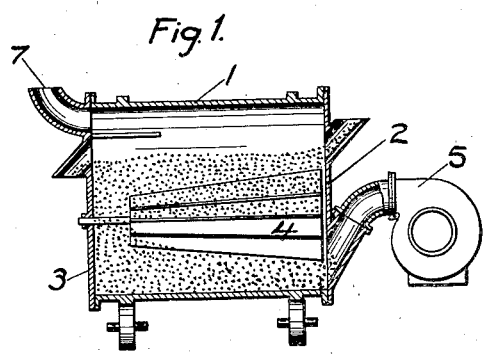
Figure 2:
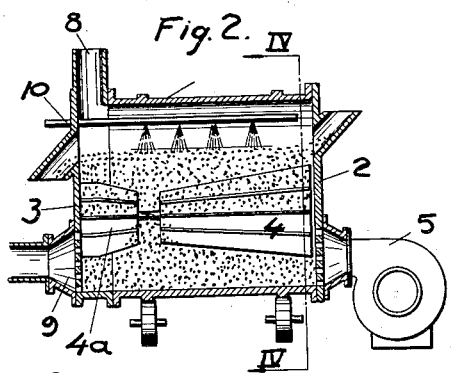
Figure 3:
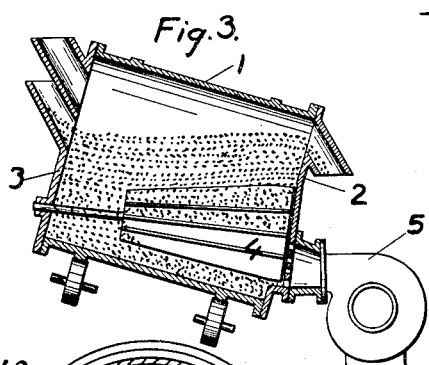
Figure 4:
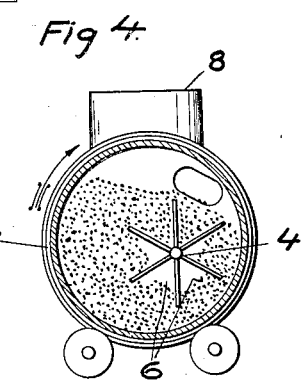
Figure 4 shows a cross section along line IV—IV of Figure 2.

The vane wheel mixing the charge and forming longitudinal canals in the same for the supply and distribution of the gas is in Figures 1, 3 and 4 indicated by reference numeral 4 and in Figure 2 by reference numerals 4 and 4a respectively. In Figure 3 the shaft of the vane wheel is journalled at an angle to the shaft of the drum.

In Fig. 4 the arrow indicates the directional rotation of the drum and the longitudinal canals 6 for the gas, which are successively formed during the rotation are shown. The forming of the canals becomes very favourable, if the rotary shaft of the vane wheel is located eccentrically in relation to the shaft of the drum or of the receptacle, as is shown in Fig. 4. During the rotation the charge material must in part slide out of the interspaces between the vanes or the paddles at the under side of the vane wheel on account of the fact that the drum then leaves the vane wheel. Even if the drum or the receptacle is stationary the vane wheel may be rotated by obtaining motive power from the outside, the charge being then mixed, and the canals or hollows for the gas being formed in the same.

In Figures 1–3 the gas supply is shown as an opening and perforations respectively at the end plate 2 below the vane wheel. By this arrangement the gas is conducted into the canals successively formed below the vane wheel and are distributed in the charge and passes through the same.

Fig. 1 shows gas outlets 7 of the end plate 3 above the charge level.

Fig. 2 shows a stationary part at the end plate 3 in the elongation of the drum, having outlets 8 for the gas above the charge level. The same figure also shows two vane wheels marked 4 and 4a respectively. At the latter an inlet 9 is shown, through which for instance cool gas may be supplied for cooling the charge previously dried and heated, or gas may also be removed from the charge.

Figure 2 shows a sprinkle pipe or the like, through which liquids or solutions may be introduced into the charge, either for evaporation or in order to cool and condense vapours, which are added to the charge. When the drum is used for these purposes the charge may consist of dry substance formed by evaporation or of other suitable material such as solid bodies, rings, balls or the like with large surfaces for contacting gases and liquids. Of course the liquid may be introduced below the level of the charge, for instance together with the gas supplied. If the charge is only to be cooled, of course only cooled air or gas is added.

In certain kinds of drying or carbonizing it is suitable to keep the heat carrying air or gas in circulation between the apparatus and a heat-delivering device, heater or the like, in which case the apparatus is provided with such a circulation pipe and heater or the like.

In Figures 5 and 6 the rotatable drum is indicated by 11, the stationary end plates by 12 and 13 respectively, the conically formed pipe for the gas supply by 14 and the vane wheel rotatable around said pipe by 15. This vane wheel is provided with partitions 16, connecting the paddles or vanes and guiding or disintegrating the gas to definite parts of the charge. When the drum is rotated the vane wheel is driven by cams or pins 17 fixed inside the drum and engaging the vane wheel. Of course the vane-wheel may receive its motion from the outside of one end plate of the drum or in any other way.

The pipe 14 is provided with longitudinal slots or the like 18, through which the gas is forced out into the charge between the paddles of the vane wheel. Of course other openings may be substituted for these slots such as perforations or the like. The gas canals mentioned before, being formed in the charge of the drum, are indicated by 19 in Figure 6. The fan forcing in the gas is indicated by 20. The drum according to Figure 5 is provided at one end with a stationary waste gas chamber or the like 21 for removing exhaust gases through the outlet 22 and for leaving material through the groove 23. The escaping gas may of course be taken out in any other way, for instance through the opening 24 of the end plate 12, where the gas is coolest. Further the circulation pipe for gas mentioned above is schematically shown and indicated by 25. This pipe runs from the waste gas chamber 21 of the drum to the sucking side of the fan 20, and a heater, heating device or the like 26 is connected to the same for heating the gas.

Figure 10:
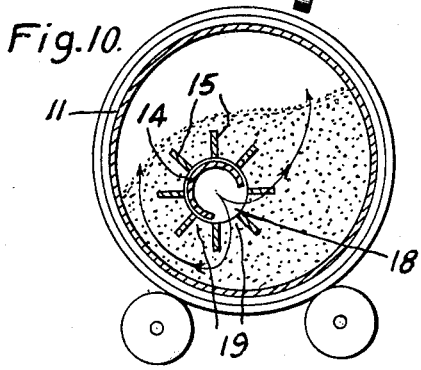
Figure 10 is a cross-sectional view taken on line X—X of Figure 9.

Figure 7 illustrates a longitudinal section and Figure 8 a cross section VIII—VIII in Figure 7 of a drying apparatus according to the present invention, but constructed in another way, suitable for certain other materials. A stationary receptacle 27 is here substituted for the rotatable drum, said receptacle having stationary end plates 12 and 13, in which receptacle the material is brought to rotation or mixing by means of stays or rods 29 mounted between co-axial rings 28, said stays or rods being rotated together with the vane wheel. Moreover the gas supply pipe 14 is shown divided into two parts with inlets from both of the end plates of the drum. Hereby the material may first be subjected to drying by means of hot gas, after that for instance to cooling by means of cool gas or carbonizing or the like. The gas inlet pipe 14 is divided for the different gases by means of walls 30. The present invention also contemplates a device in which the drum is of conical shape. In Figures 9 and 10 such a construction is shown. Since the construction is otherwise the same as that previously described, a further description thereof in detail is not believed necessary.

The construction of the apparatus may of course vary essentially without departing from the principle of the invention. One (or both) of the end plates may be rotatable. The material is then passed in and out of the apparatus respectively by means of known devices.

Of course the vane wheel may be formed in different ways. In the accompanying drawings the same is shown having six straight vanes. However, the same may be shaped with more or less vanes, inclined or divided, perforated or provided with annular parts, facilitating the technical effect for different purposes and materials. The vane wheel may also be shaped in such a way that the same is adapted to be flowed through and heated by vapour or any other heating medium, whereby heat is supplied directly to the charge from the vane-wheel. By this the gas or air supply required may be reduced, in certain cases down to the minimum, which is required to remove the vapour formed during the drying process.

Having now described my invention, what I claim as new and desire to secure by Letters Patent is:

1. An apparatus for carrying out heat exchange process substantially on materials in the form of powder, grains and pieces by transfer of heat between the same and a gas, provided with a substantially horizontal rotatable drum for receiving the material, said drum having a rotatable vane-wheel, said members being stationarily journalled under the level of the charge in the longitudinal direction of the drum, the vanes of said wheel extending to form longitudinal canals for the gas in the charge during the rotation, said vane-wheel being rotatably journalled around a pipe arranged in a fixed position in the longitudinal direction of the drum, through which pipe the gas is introduced into and removed from the charge if desired, the gas pipe constituting a shaft for the vane-wheel being connected to gas supply pipes outside the two ends of the vane-wheel, by which supplies of gas at different temperatures may be introduced simultaneously with the action of the vane-wheel for different kinds of heat treatment, such as first heating and drying, and then cooling.

2. An apparatus for carrying out a heat exchange process on materials in the form of powder, grains and pieces by transferring heat between the same and a gas, comprising a substantially horizontal rotatable drum for receiving the material, said drum having a rotatable vane-wheel, a shaft for the vane-wheel journalled under the level of the charge and in the longitudinal direction of the drum, the vanes of said wheel extending to form longitudinal channels for the gas in the charge during the rotation of the vane-wheel, and means for introducing a gas, serving as a heat exchange medium, directly into the charge at the axis of the vane-wheel.

3. An apparatus as set forth in claim 2, in which the rotary shaft of the vane-wheel is located eccentrically in relation to the axis of the drum.

4. An apparatus as set forth in claim 2, in which inlets for the heat exchange gas are arranged at both ends of the apparatus at the vane-wheel.

5. An apparatus as set forth in claim 2, in which the drum is conical.

6. An apparatus as set forth in claim 2, in which outlets for the gas leaving the charge are arranged at the vane-wheel substantially below the level of the charge and in which the vane-wheel is arranged so as to be traversed by a fluid 7. An apparatus for carrying out a heat exchange process on materials in the form of powder, grains and pieces by transferring heat between the same and a gas, comprising a substantially horizontal rotatable drum for receiving the material, said drum having a rotatable vane-wheel, a pipe serving as a shaft for the vane-wheel journalled under the level of the charge and in the longitudinal direction of the drum, the vanes of said wheel extending to form longitudinal channels for the gas in the charge during rotation of the vane-wheel, and means for passing a heat exchange gas through said pipe for introducing the gas into the charge.

8. Apparatus as set forth in claim 7, in which the gas pipe, constituting a shaft for the vane-wheel, communicates with gas supply pipes outside the two ends of the vane-wheel, by means of which supplies of gas of different temperatures may, in cooperation with the vane wheel, be introduced into the charge for different kinds of heat treatment.

9. An apparatus for carrying out a heat exchange process on materials in the form of powder, grains and pieces by transferring heat between the same and a gas, comprising a substantially horizontal rotatable drum for receiving the material, said drum having a rotatable vane-wheel, a shaft for the vane-wheel journalled under the level of the charge and in the longitudinal direction of the drum, the vanes of said wheel extending to form longitudinal channels for the gas in the charge during the rotation of the vane-wheel, and a plurality of cams positioned on the inner surface of the drum for stirring the material and adapted to engage the vanes of the vane-wheel to effect rotation thereof.

10. An apparatus for carrying out a heat exchange process on materials in the form of powder, grains and pieces by transferring heat between the same and a gas, comprising a substantially horizontal rotatable drum for receiving the material, said drum having a rotatable vane-wheel, a shaft for the vane-wheel journalled substantially under the level of the charge and in the longitudinal direction of the drum, in which the rotatable vane-wheel is arranged so as to be traversed by a fluid in order to effect an exchange of heat between the same and the charge.

11. An apparatus for carrying out a heat exchange process on materials in the form of powder, grains and pieces by transferring heat between the same and a gas, comprising a rotatable drum for receiving the material, said drum having a rotatable vane-wheel, a shaft for the vane-wheel journalled substantially under the level of the charge and in the longitudinal direction of the drum, the vanes of said wheel extending to form longitudinal channels for the gas in the charge during the rotation of the vane-wheel, and means for introducing a gas, serving as a heat exchange medium, directly into the charge, said drum having outlets for the gas leaving the charge arranged at the vane-wheel substantially below the level of the charge.

12. An apparatus for carrying out a heat exchange process on materials in the form of powder, grains and pieces by transferring heat between the same and a gas, comprising a rotatable drum for receiving the material, said drum having a rotatable vane-wheel, a shaft for the vane-wheel journalled substantially under the level of the charge and in the longitudinal direction of the drum, the vanes of said wheel extending to form longitudinal channels for the gas in the charge during the rotation of the vane-wheel, and means for introducing a gas, serving as a heat exchange medium, directly into the charge, the vane-wheel being arranged so as to be traversed by a fluid in order to effect an exchange of heat between the same and the charge.

13. An apparatus for carrying out a heat exchange process on materials in the form of powder, grains and pieces by transferring heat between the same and a gas, comprising a rotatable drum for receiving the material, said drum having a rotatable vane-wheel, a shaft for the vane-wheel journalled substantially under the level of the charge and in the longitudinal direction of the drum, the vanes of said wheel extending to form longitudinal channels for the gas in the charge during the rotation of the vane-wheel, and means for introducing a gas, serving as a heat exchange medium, directly into the charge, the apparatus being combined with means for supplying liquid to the charge for evaporating the liquid and for cooling the gas introduced into the charge.

GUSTAV BOJNER.